(12) United States Patent
Parker et al.

(10) Patent No.: US 9,422,840 B2
(45) Date of Patent: Aug. 23, 2016

(54) HYDRAULIC VALVE FOR AN INTERNAL COMBUSTION ENGINE

(71) Applicant: HILITE GERMANY GMBH, Marktheidenfeld (DE)

(72) Inventors: Kenneth J. Parker, Clarkston, MI (US); John Snyder, Irving, TX (US); Brian Sapp, Muskegon, MI (US); Udo Diederichs, Nürtingen (DE); Melissa Mei Koenig, Ann Arbor, MI (US)

(73) Assignee: HILITE GERMANY GMBH (DE)

( * ) Notice: Subject to any disclaimer, the term of this patent is extended or adjusted under 35 U.S.C. 154(b) by 0 days.

(21) Appl. No.: 14/312,858

(22) Filed: Jun. 24, 2014

(65) Prior Publication Data

US 2015/0369092 A1 Dec. 24, 2015

(51) Int. Cl.
| | |
|---|---|
| *F01L 1/34* | (2006.01) |
| *F01L 9/02* | (2006.01) |
| *F01L 1/04* | (2006.01) |
| *F01L 1/344* | (2006.01) |
| *F16K 11/07* | (2006.01) |
| *F16K 15/14* | (2006.01) |
| *F16K 15/18* | (2006.01) |

(52) U.S. Cl.
CPC .......... *F01L 9/025* (2013.01); *F01L 1/04* (2013.01); *F01L 1/3442* (2013.01); *F16K 11/07* (2013.01); *F16K 15/142* (2013.01); *F16K 15/185* (2013.01); *F01L 2001/34426* (2013.01); *F01L 2001/34433* (2013.01)

(58) Field of Classification Search
CPC ......... F01L 1/04; F01L 1/3442; F01L 9/025; F01L 2001/34426; F01L 2001/34433
USPC ............................... 123/90.12, 90.15, 90.17
See application file for complete search history.

(56) References Cited

U.S. PATENT DOCUMENTS 8,397,687 B2 * 3/2013 Lichti .................. F01L 1/3442
123/90.15

* cited by examiner

*Primary Examiner* — Ching Chang
(74) *Attorney, Agent, or Firm* — Clark Hill PLC; James R. Foley

(57) ABSTRACT

In a hydraulic valve comprising a spool, one or more band-shape check valves and an enclosing bolt or snout, the check valve may be compressed to the point of excessive wear or failure and may impede spool movement. The problem outlined is solved by an inventive hydraulic valve for use with a cam phasing apparatus of an internal combustion engine. The hydraulic valve comprises a hollow bolt or snout, check valves, and a spool disposed inside the bolt while still being able to shift axially within the bolt. The bolt and spool are configured to provide fluid passageways between the spool and the cam phasing apparatus depending on a translational displacement of the spool. Furthermore, the spool is configured to allow an oil flow through the fluid passageway, yet limit a compression of the band-type check valves.

18 Claims, 7 Drawing Sheets

HYDRAULIC VALVE FOR AN INTERNAL COMBUSTION ENGINE

TECHNICAL FIELD

The present invention relates to hydraulic valve, and particularly to an oil control valve for variable camshaft timing in an internal combustion engine.

BACKGROUND ART

In the context of internal combustion engines (ICEs), the technique of altering the timing of a valve lift event is commonly referred as variable valve timing (VVT). Use of such design is known in the art in order to, inter alia, improve upon the performance, fuel economy, or reduce the emissions of an internal combustion engine to which it is applied. Especially in the automotive industry, increasingly strict environmental regulations are causing countless manufacturers to modify the relative timing, duration, or opening of their engines' inlet and exhaust valves.

Among several approaches to variable valve timing known to the skilled person, so-called cam phasing allows to change the phase of the camshaft's and valves' periodic movement. To this end, the camshaft is rotated relatively to the crankshaft. When compared to a fixed camshaft, cam phasing not only enables an internal combustion engine to deliver high power, but also to work tractably and efficiently at low power.

Conventional apparatus for cam phasing comprises an electronically controlled hydraulic valve called an oil control valve (OCV). The hydraulic valve is designed as a multiple-port, multiple-position valve in cartridge construction. Non-return check valves, which are designed as band-shape rings, are inserted on the inside of the snout or central bolt. By means of these non-return check valves, camshaft alternating torques are utilized in order to assist camshaft adjustment more rapidly and with a relatively low oil pressure. For this purpose, check valves open to utilize pressure peaks as a consequence of camshaft alternating torques and cover the openings to prevent back flow into the lower pressure port.

In a typical implementation, a powertrain control module (PCM) may transmit a signal to an associated solenoid to move a spool of this hydraulic valve, thereby regulating the flow of oil to the cavity. This allows for the camshaft to be slightly rotated from its initial orientation, serving to advance or retard the resulting timing. Besides other criteria, the powertrain control module may control the camshaft timing depending on a current load on the engine or frequency of its rotation.

DISCLOSURE OF THE INVENTION

Technical Problem

A common problem in this context is the tendency to compress the aforementioned band-shape check valve under working conditions. This behavior may result in the valve material being overstressed up to the point of breakage. Furthermore, even a slight interference of the compressed check valve with the spool's movement may adversely affect the precision of the overall cam timing or cause the check valve to wear. Under extreme conditions, there is a risk of the check valve gradually moving out of its designated pocket.

Technical Solution

The problem outlined is solved by an inventive hydraulic valve that encompasses one or more band-type check valves for use with a cam phasing apparatus of an internal combustion engine. The hydraulic valve comprises a hollow bolt, check valves, and a spool disposed inside the bolt while still being able to shift axially within the bolt. The bolt and spool are configured to provide fluid passageways between the spool and the cam phasing apparatus depending on a translational displacement of the spool. Furthermore, the spool is configured to limit a compression of the check valves.

Advantageous Effects

The proposed design limits compression of the check valves, consequently reducing the negative effects brought about by over-compression. Additional advantages of the invention may be derived from the patent claims, the description, and the drawings.

BRIEF DESCRIPTION OF THE DRAWINGS

Similar reference characters denote corresponding features consistently throughout the attached drawings.

BEST MODE FOR CARRYING OUT THE INVENTION

Figure 1:
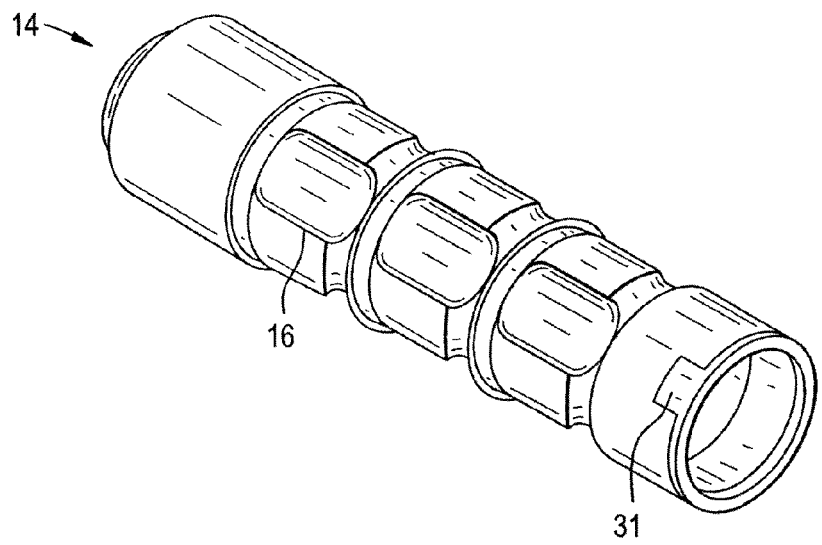
FIG. 1 is a view of a spool for a hydraulic valve according to a first embodiment of the invention.

The perspective view of FIG. 1 illustrates a spool 14 for use with a hydraulic valve 10 according to a first embodiment of the invention. Such hydraulic valve 10 in turn may be adapted for use with a cam phasing apparatus (not depicted) of an internal combustion engine (not depicted).

Figure 2:
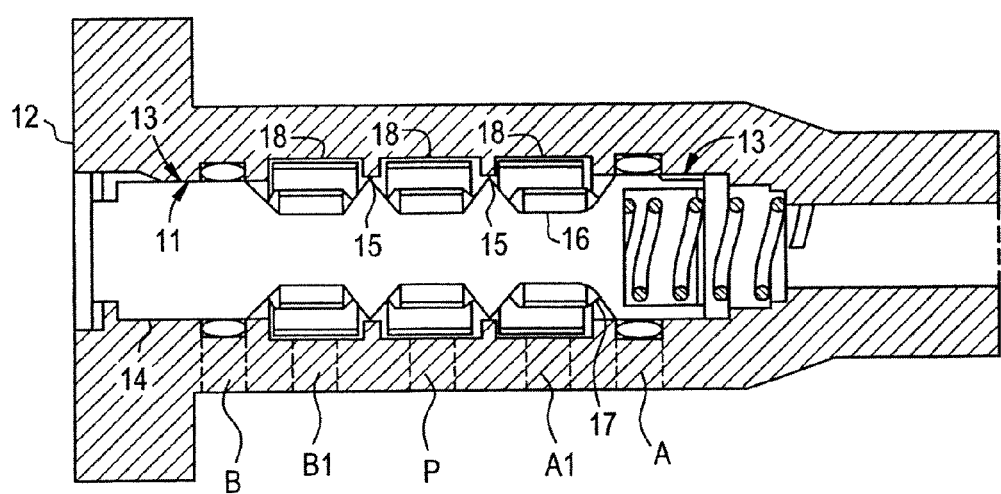
FIG. 2 is a cross-section of the hydraulic valve according to the first embodiment, the spool assuming a mid-position.

FIG. 2 is a cross-section of the hydraulic valve 10 in its entirety. As shown in this figure, the hydraulic valve 10 is essentially formed by a hollow bolt or snout 12 with the spool 14 being disposed coaxially inside the bolt 12. Bolt 12 has recessed pockets forming seats for check valve 18. The check valves allow flow into the bolt but restrict flow out. Herein, the bolt 12 and the spool 14 are configured such that the spool 14, while still being able to shift axially, is essentially captive inside the bolt 12. The relative geometry of the bolt 12 and the spool 14 thus allows for a certain degree of translational displacement of the spool 14 within the bolt 12.

Depending on this translational displacement, the bolt 12 and spool 14 can be aligned to provide fluid passageways between the spool 14 and the cam phasing apparatus. To this end, the external surface 13 of the spool 14 provides a plurality of peripheral lands 15 that are specifically configured to interface with the internal surface 11 of the bolt 12. Particularly, the lands 15 are positioned and spaced in such a way that the passageway may be blocked or unblocked in response to a certain translational displacement of the spool 14.

As best seen in FIG. 1, a plurality of annular grooves 16 are formed in the external surface 13 of the spool 14. These grooves 16 are arranged about the congruent longitudinal axes of the spool 14 and the bolt 12. It should be understood that, while the figure shows an equiangular arrangement of grooves 16, the grooves 16 may well be spaced in a nonuniform fashion. Each groove 16 extends axially between two adjacent lands 15, opening out bilaterally into reduced diameter portions 17 of the spool 14 provided in its external surface 13 proximate the respective land 15.

Figure 3:
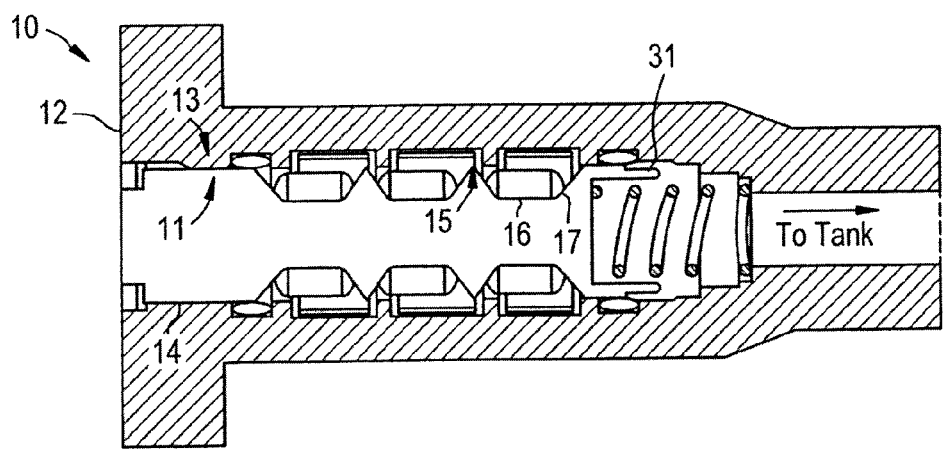
FIG. 3 is a cross-section of the hydraulic valve, the spool assuming its leftmost position.
Figure 4:
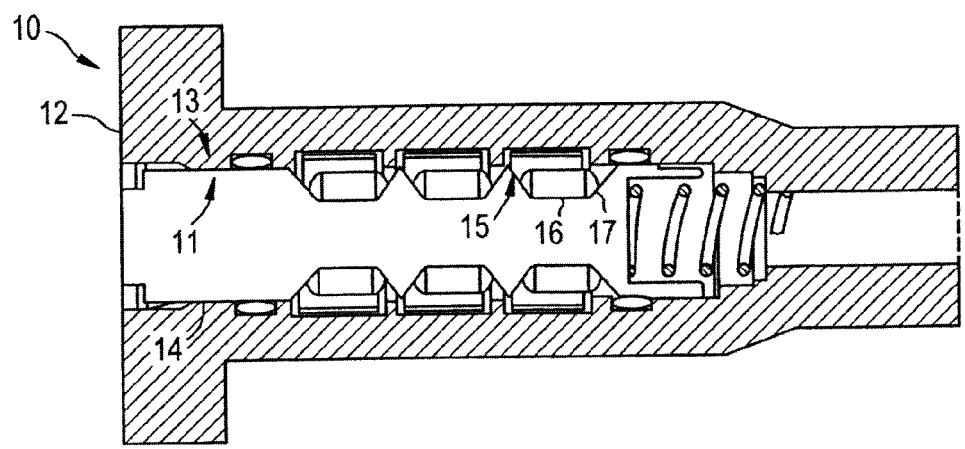
FIG. 4 is a cross-section of the hydraulic valve, the spool assuming its rightmost position.

FIG. 2, FIG. 3, and FIG. 4 illustrate three different positions of the spool 14, each position corresponding to a specific translational displacement with respect to the surrounding bolt 12. In the mid-position of FIG. 2, spool lands 13 and 15 align with a bolt land of the inner diameter 11, impeding flow within the spool. In FIG. 3 and FIG. 4, the spool positions direct flow to change the phase angle. The axial positioning of the spool lands meter the flow. The grooves in the spool allow flow while limiting the compression of the check valve.

From FIG. 2 it becomes obvious that the spool can distribute hydraulic fluid from a pressure supply port P to a first working port A and/or a second working port B. If hydraulic fluid flows to the first working port A, hydraulic fluid from the second working port B1 is allowed to recirculate to A. Opposite to that the first working port A1 is allowed to recirculate to B when oil flows from the power supply port P to the second working port B. When the spring pushes the spool to its resting position, port A is allowed to exhaust through a small tank port 31 (see FIGS. 1 and 4).

MODE(S) FOR CARRYING OUT THE INVENTION

Figure 5:
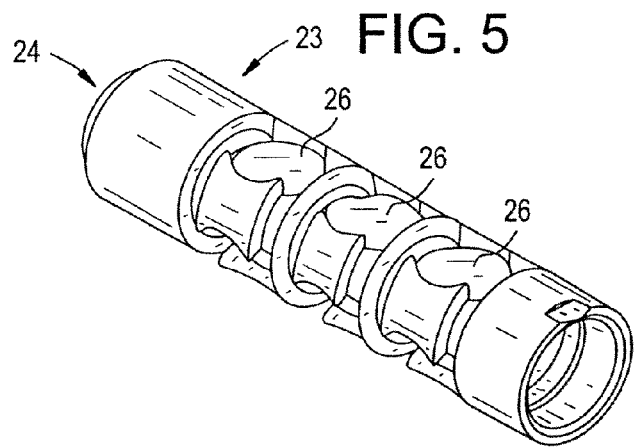
FIG. 5 is a view of a spool for a hydraulic valve according to a second embodiment of the invention.

The perspective view of FIG. 5 shows a spool 24 for a hydraulic valve according to a second embodiment of the invention. In this second embodiment, the grooves 16 of the first embodiment are replaced by nine stud or blind holes 26 forming three annuli drilled into the external surface 23 of the spool 24. Herein, each of the annuli comprises three blind holes 26 arranged about the longitudinal axis of the spool 24. It should be understood that, while the figure shows an equiangular arrangement of blind holes 26, the blind holes 26 may well be spaced in a nonuniform fashion.

Figure 6:
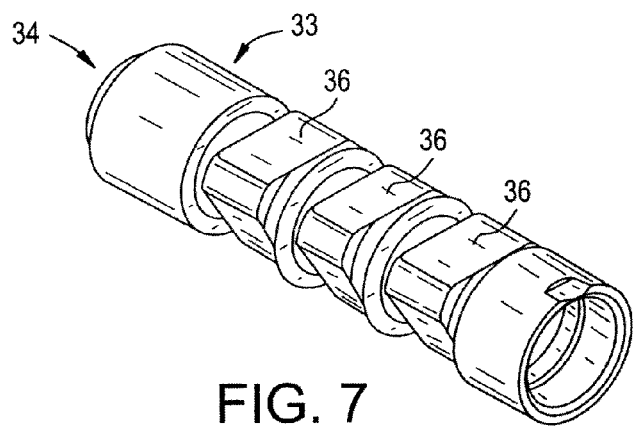
FIG. 6 is a view of a spool for a hydraulic valve according to a third embodiment of the invention.

A similar modification is employed in the case of a spool 34 for a hydraulic valve according to a third embodiment, illustrated in FIG. 6. In this case, three annuli of three flats 36 each are milled or honed into the external surface 33, essentially serving the same purpose as the grooves 16 of the first embodiment and the blind holes 26 of the second embodiment.

Figure 7:
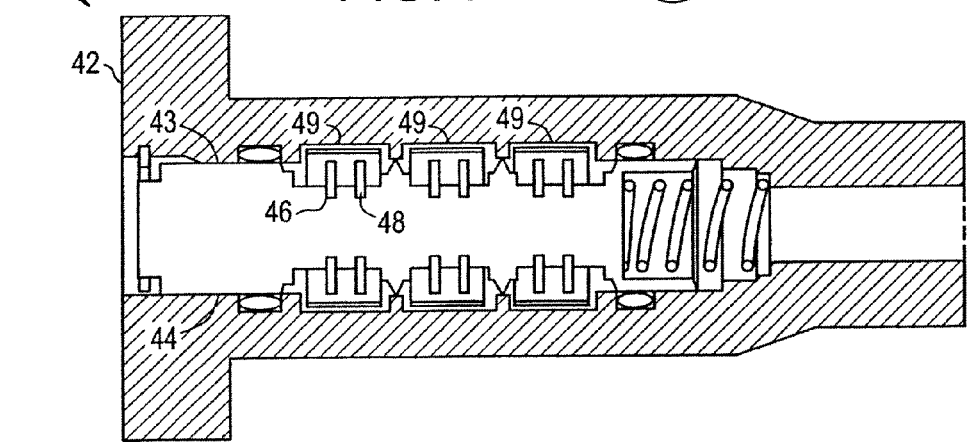
FIG. 7 is a cross-section of a hydraulic valve according to a fourth embodiment of the invention.

The cross-section of FIG. 7 discloses a fourth embodiment of the invention that may be considered a variation on the first embodiment. Here, again a plurality of grooves 46 is formed in the external surface 43 of the spool 44. However, in addition to the spool 44 and bolt 42, the hydraulic valve 40 comprises a total of six e-clips 48, which are retained in grooves 46, serving to limit check valve compression while allowing flow through the e-clips.

Figure 8:
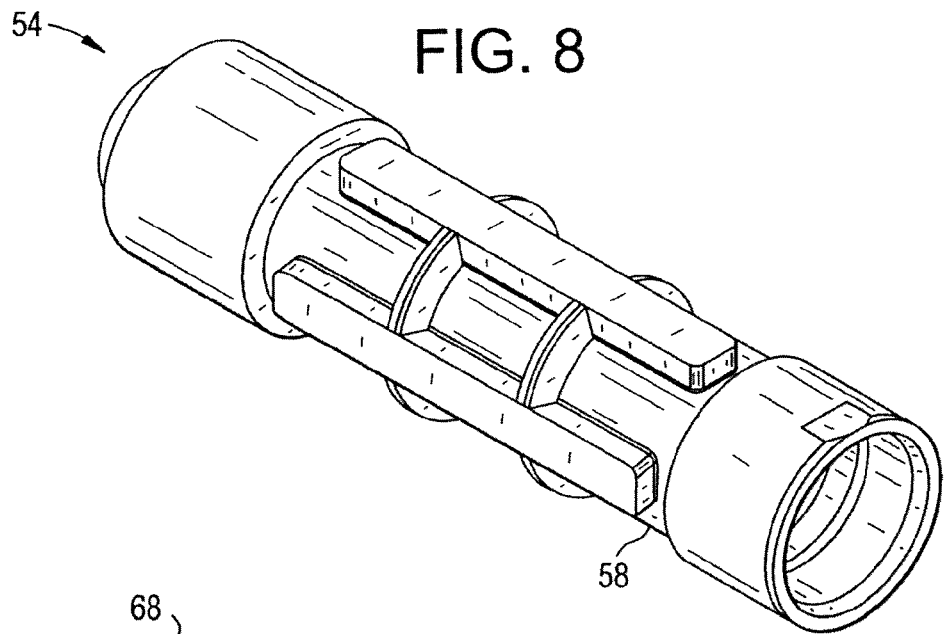
FIG. 8 is a view of a spool for a hydraulic valve according to a fifth embodiment of the invention.

An alternative variation on the first embodiment may be taken from FIG. 8, whose perspective view illustrates a way to cover the interior features of the spool 54 by means of an exterior overmold 58.

FIG. 9 to FIG. 12 each refer to a sixth embodiment of the invention. A hydraulic valve 60 according to this embodiment is characterized by an essentially tubular cartridge 68 for holding the spool 64, the cartridge 68 in turn being disposed inside the bolt 62. The check valves 63 are placed around the cartridge but inside the bolt. The check valve compression is limited to the cartridge outside diameter. When being shifted, the spool 64 thus effectively rides on the inside of the cartridge 68, the latter forming a physical barrier separating the check valves 63 and the spool 64.

Figure 9:
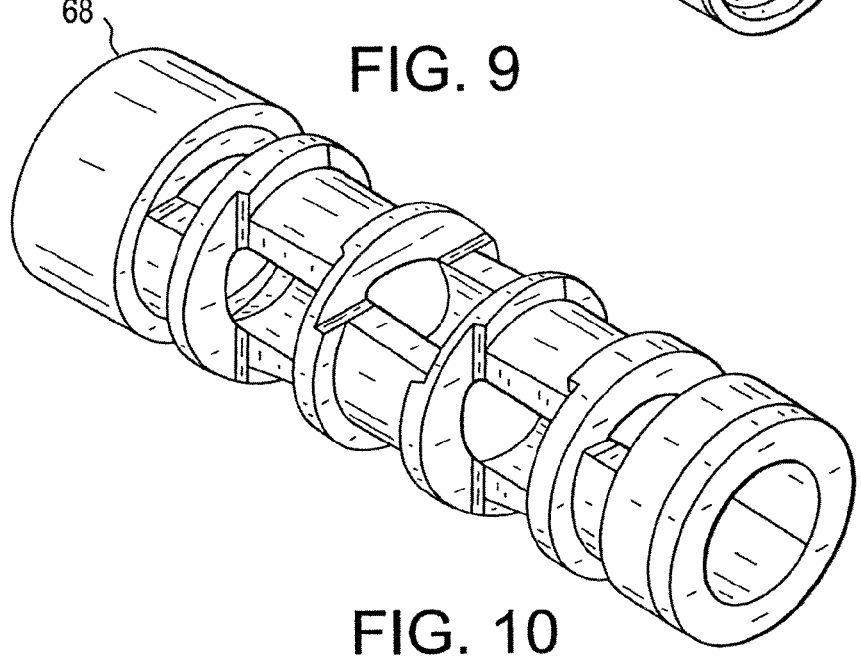
FIG. 9 is a first view of a cartridge for a hydraulic valve according to a sixth embodiment of the invention.
Figure 10:
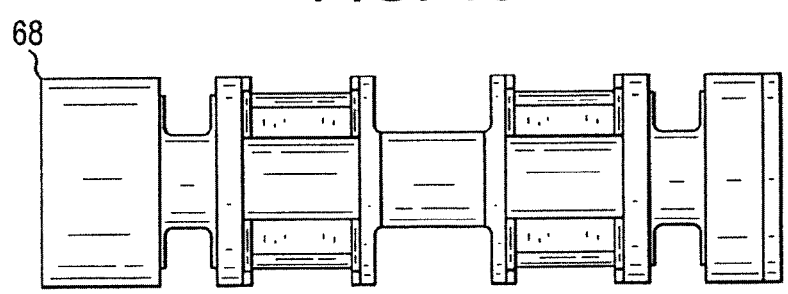
FIG. 10 is a second view of the cartridge.
Figure 11:
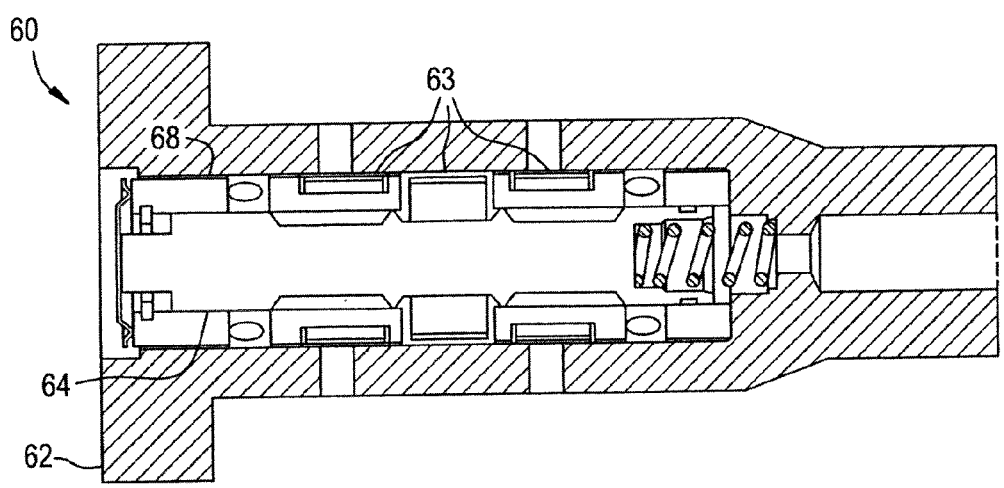
FIG. 11 is a first cross-section of the hydraulic valve according to the sixth embodiment.
Figure 12:
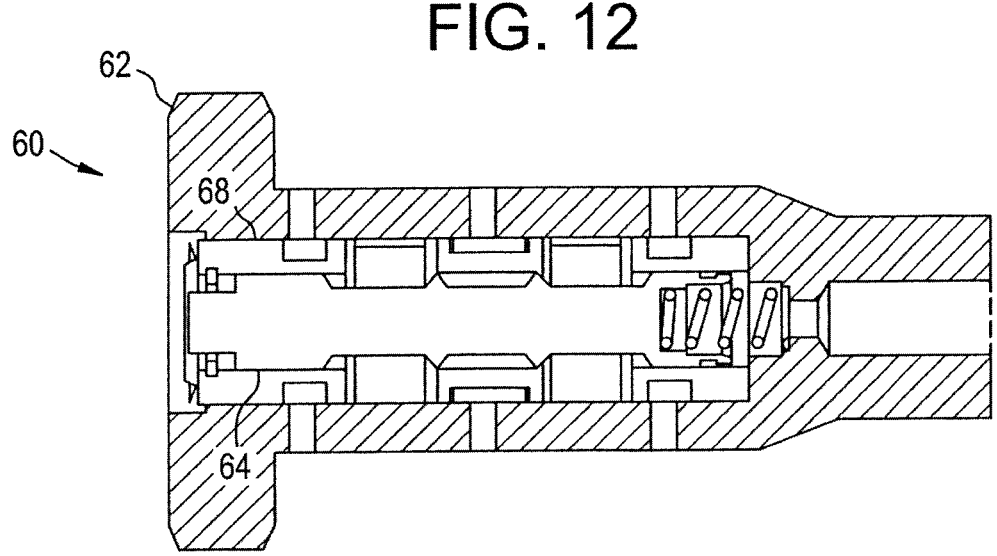
FIG. 12 is a second cross-section of the hydraulic valve.

Owing to its fairly complex geometry, FIG. 9 and FIG. 10 show two views of the cartridge 68 from different perspectives. Similarly, FIG. 11 and FIG. 12 provide cross-sections of the complete hydraulic valve 60 in two orthogonal planes to elucidate its design.

Figure 13:
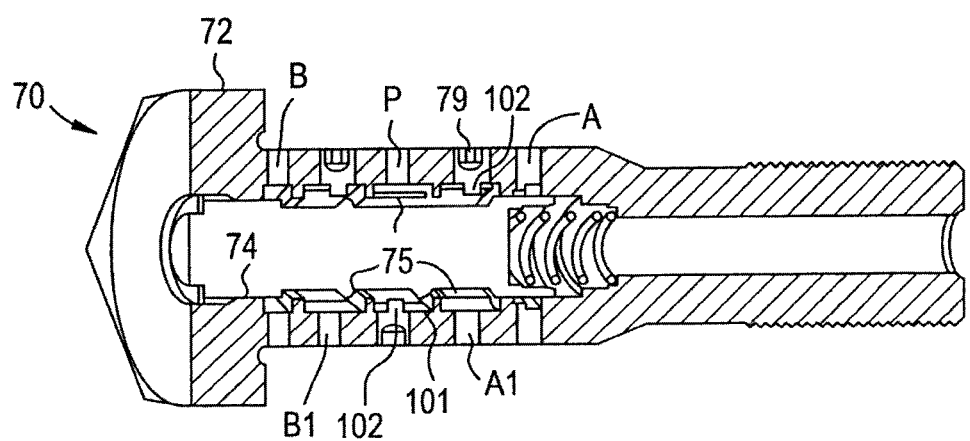
FIG. 13 is a partial view of a hydraulic valve according to a seventh embodiment of the invention.

FIG. 13 is a partial view of a hydraulic valve 70 according to a seventh embodiment. In addition to the bolt 72 and spool 74, this hydraulic valve 70 comprises three or more circumferential stops 79 installed inside the bolt 72, each stop 79 protruding toward the longitudinal axis of the spool 74 to limit compression of the check valves 75. Preferably, the stops 79 are configured to prevent any contact of the spool 74 with the check valves 75. The stops 79 are headless screws screwed into radial threaded holes in the bolt 72. The inner ends of the stops 79 are shaped like a pin 102 protruding towards the longitudinal axis of the spool 74.

Figure 15:
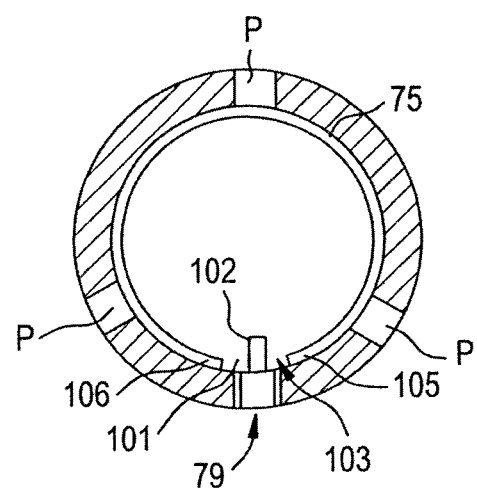
FIG. 15 shows the hydraulic valve according to FIG. 13 in a cross section orthogonal to its longitudinal axis.

FIG. 15 shows an orthogonal cross section of the hydraulic valve 70. As long as the check valves 75 closes the hole establishing the supply port P, it covers this hole. In this state, the diameter of the band check valve 75 is at its maximum. In a circumferential position, the end faces 105, 106 of the band check valve 75 are distanced with clearances 101, 103 in relation to the pin 102. If one of end faces 105/106 moves closer to the pin 102 the clearance 101/103 between the other end face 106/105 and the pin 75 increases. If hydraulic pressure on the supply port P causes the diameter of the check valve 75 to decrease, the clearances 101/103 also decrease. If both end faces 105/106 contact the pin 75, the band check valve 75 cannot decrease anymore in diameter. Consequently it cannot contact the spool 74.

Figure 14:
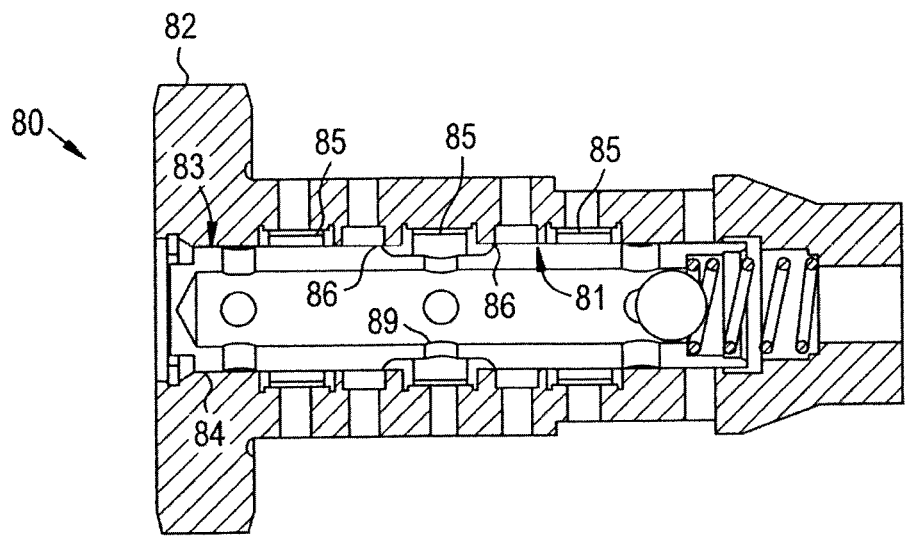
FIG. 14 is a cross-section of a hydraulic valve according to an eighth embodiment of the invention.

FIG. 14 finally illustrates an entirely different approach to limiting the check valve 85 from over-compression. In this eighth embodiment of the present invention, the spool 84 is hollow and has an essentially continuous exterior surface 83 with several ports 89 formed therein. Consequently, the fluid passageway comprises the ports 89, each of which opens up to the interior cavity formed inside the spool 84, allowing for hydraulic fluid such as oil to flow through the spool 84 and its ports 89 on to the cam phasing apparatus. This design limits compression of the two outside check valves that interface with the cam phaser. Since the oil flows within the spool, no special features are required on the spool under the check valves. The center check valve can compress to the smaller spool diameter, however spool lands 86 do not travel beneath the check valve in any spool position.

With regard to the non-return check valves mentioned herein in connection with FIGS. 2-4, 7, 11, 12 and 14 (i.e., part numbers 18, 63), in each case the check valve can be provided as disclosed in U.S. Pat. No. 7,600,531 (which is hereby incorporated herein by references in its entirety), wherein the check valve is an overlapping metal (preferably steel) spring band which is continuous, and free from openings. The band compresses when pressure outside the bolt is greater than inside the bolt, and expands when pressure inside the bolt is greater than outside the bolt. The check valve 75 shown in FIGS. 13 and 15 can be provided as being much the same, but having a gap (i.e., clearance) between its end faces 105, 106 rather than overlapping ends.

It is to be understood that the present invention is not limited to the embodiments described above, but encompasses any and all embodiments within the scope of the claims below.

INDUSTRIAL APPLICABILITY

A hydraulic valve 10, 40, 60, 70, 80 according to the invention may be advantageously applied, inter alia, in the automotive industry.

The invention claimed is:

1. A hydraulic valve for use with a cam phasing apparatus of an internal combustion engine, comprising: a bolt having a surface which provides a plurality of fluid ports; a spool disposed inside the bolt, said spool having two ends, and said spool configured to shift axially within the bolt and a plurality of band-shape check valves spaced apart from the ends of the spool and disposed radially between the spool and the bolt, wherein the bolt, the spool, and the band-shape check valves are configured to provide a fluid passageway between the spool and the cam phasing apparatus depending on a translational displacement of the spool, wherein the spool is further configured to limit compression of the band-type check valves when the band-type check valves open to allow flow into the bolt.

2. The hydraulic valve as recited in claim 1, wherein the spool has an external surface to limit compression of the band-type check valves, and a groove is formed in the external surface to allow flow.

3. The hydraulic valve as recited in claim 2, wherein the bolt has an internal surface and wherein the spool has peripheral lands configured to interface with the internal surface such that the fluid passageway is blocked depending on the translational displacement.

4. The hydraulic valve as recited in claim 3, wherein the groove of the spool extends axially between two of the peripheral lands.

5. The hydraulic valve as recited in claim 4, wherein the external surface of the spool provides reduced diameter portions between the peripheral lands and wherein the groove opens out bilaterally into the reduced diameter portions.

6. The hydraulic valve as recited in claim 2, wherein the groove of the spool is one of a plurality of annular grooves arranged equiangularly about the longitudinal axis of the spool.

7. The hydraulic valve as recited in claim 2, further comprising an e-clip installed in the groove to limit the compression of the check valves.

8. The hydraulic valve as recited in claim 1, wherein the spool has an external surface to limit the compression of the check valves and a blind hole is formed in the external surface to allow hydraulic flow.

9. The hydraulic valve as recited in claim 8, wherein the blind hole is one of three annular blind holes arranged equiangularly about the longitudinal axis of the spool.

10. The hydraulic valve as recited in claim 1, wherein the spool has an external surface to limit the compression of the check valves and a flat is formed in the external surface to allow hydraulic flow.

11. The hydraulic valve as recited in claim 10, wherein the flat is one of three annular flats arranged equiangularly about the longitudinal axis of the spool.

12. The hydraulic valve as recited in claim 1, wherein the spool comprises an exterior overmold.

13. The hydraulic valve as recited in claim 1, further comprising an essentially tubular cartridge for holding the spool, wherein the cartridge is disposed inside the bolt to limit the compression of the check valves.

14. The hydraulic valve as recited in claim 1, further comprising a radial stop installed inside the bolt, the stop protruding toward the longitudinal axis of the spool to limit the compression of the check valves.

15. The hydraulic valve as recited in claim 14, wherein a check valve is provided on the bolt proximate an end of the spool and wherein the stop is configured to prevent the spool from contacting the check valve.

16. The hydraulic valve as recited in claim 14, wherein the stop comprises headless screws threaded into threaded bores in bolt.

17. The hydraulic valve as recited in claim 1, wherein the spool is hollow and has an essentially continuous exterior surface with a port formed therein such that the fluid passageway comprises the port.

18. The hydraulic valve as recited in claim 1, wherein the band-shape check valves cover at least some of the fluid ports and compress to allow flow into the bolt.

* * * * *